Figure 1:

Feb. 27, 1962 W. C. SANDOR 3,023,037
WIRE COUPLING CONNECTION
Filed Jan. 15, 1959 2 Sheets-Sheet 1

INVENTOR.
WILLIAM C. SANDOR
BY
ATT

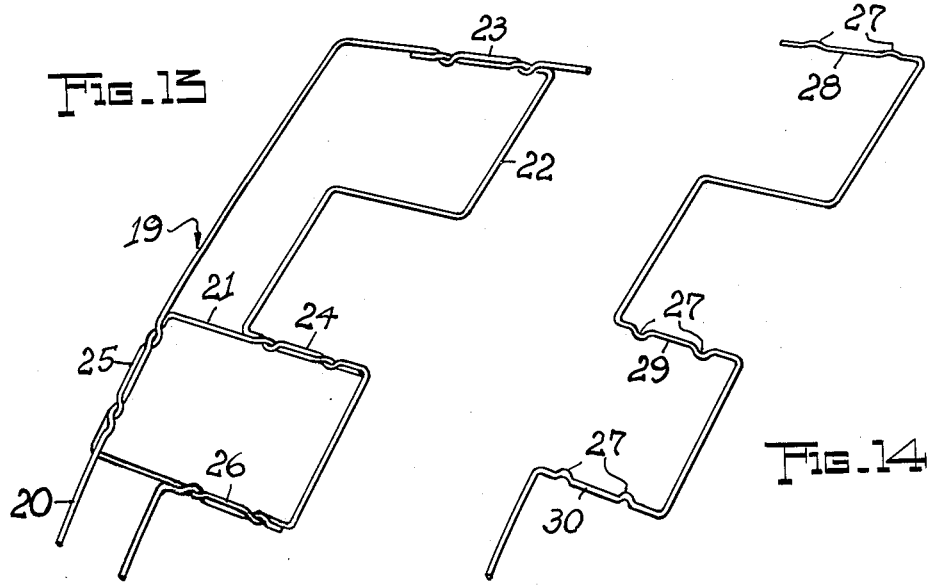
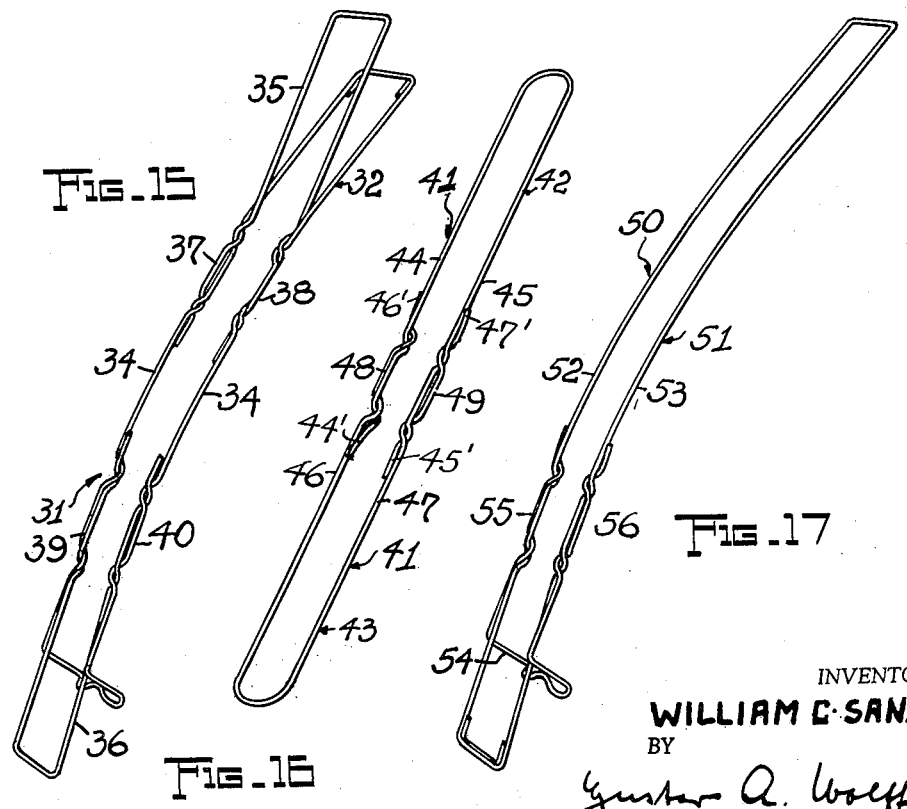

United States Patent Office  3,023,037
Patented Feb. 27, 1962

3,023,037
WIRE COUPLING CONNECTION
William C. Sandor, Solon, Ohio, assignor, by mesne assignments, to Hoover Ball & Bearing Co., Saline, Mich., a corporation of Michigan
Filed Jan. 15, 1959, Ser. No. 786,998
5 Claims. (Cl. 287—77)

This invention relates in general to coupling connections between steel wires and steel wire elements and, more particularly, to coupling connections longitudinally connecting steel wires and steel wire elements.

The general object of this invention is the provision of a simple, economic, releasable coupling connection between straight, overlapped steel wire portions of steel wires and steel wire elements, the overlapped steel wire portions being provided with spaced notch-like configurations engaged with each other in hook-like angular relation and dimensioned to place these straight steel wire portions close to each other to effect interlacing of these straight steel wire portions and permit transfer of tensile and torsional stresses between such straight steel wire portions.

Coupling connections of this type are better suited than welding wire spring elements of high carbon steel wire to wire spring structures, as welded wire spring structures of this type must be annealed and thus lose part of the carbon content of the high carbon steel wire, which results in loss of elasticity of the wire spring elements.

Another object of the invention is the provision of a releasable coupling connection of the type described above, having in each of the overlapped straight steel wire portions a pair of spaced notch-like configurations which are dimensioned to place the straight steel wire portions close to each other, interlace such wire portions and permit transfer of tensile and torsional stresses therebetween.

Coupling connections of the type described above have in the straight steel wire portions notches located and dimensioned to effect contact of the straight steel wire portions and, furthermore, have these straight steel wire portions sprung around each other, as well as interlaced and thus tightly but releasably connect the straight steel wire portions with each other.

A further object of the invention is the provision of a releasable coupling connection of the type described above, having the notch-like configurations in the straight steel wire portion spaced from each other by straight wire sections and having such configurations engaged with each other in hook-like angular relation and dimensioned to place such straight wire sections close to each other to permit interlacing of the straight steel wire portions by springing same in spaced areas around each other.

Still another object of the invention is the provision of a releasable coupling connection of the type described, in which the steel wire elements include a pair of parallel, straight steel wire portions arranged to overlap each other in parallel relation, and in which each straight steel wire portion of the pairs embodies spaced notch-like configurations arranged and dimensioned to engage in hook-like angular relation notch-like configurations of the other straight steel wire portion.

A further object of the invention is the provision of a releasable coupling connection of the type described above, in which the notch-like configurations in one straight steel wire portion are rectangularly related to the notch-like configurations in the other straight steel wire portion.

Still a further object of the invention is the provision of a releasable coupling connection of the type described above, in which the notch-like configurations in the pairs of straight steel wire portions of the steel wire elements extend in angular relation to the planes of the steel wire elements.

Additional other objects and novel features of construction, combinations and relations of parts by which the objects in view have been attained will appear and are set forth in detail in the course of the following specification. The drawings accompanying and forming part of the specification illustrate a certain practical embodiment of the invention, but it will be apparent as the specification proceeds that the illustrated structure may be modified and changed in various ways without departure from the true spirit and broad scope of the invention.

Figure 2:
Figure 3:
Figure 4:
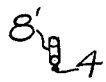
Figure 5:
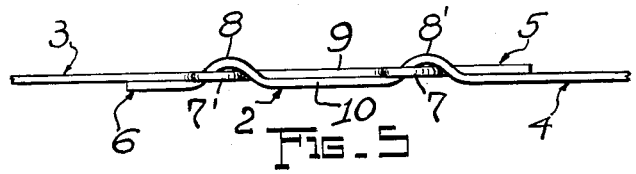
Figure 6:
Figure 7:
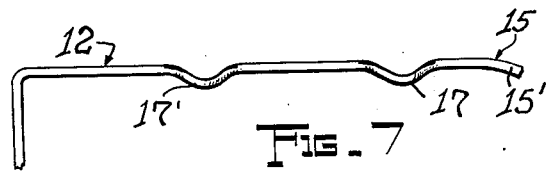
Figure 8:
Figure 9:
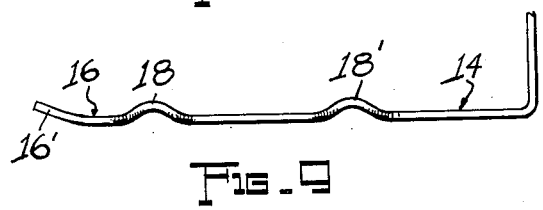
Figure 10:
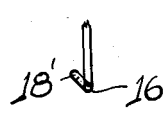
Figure 11:
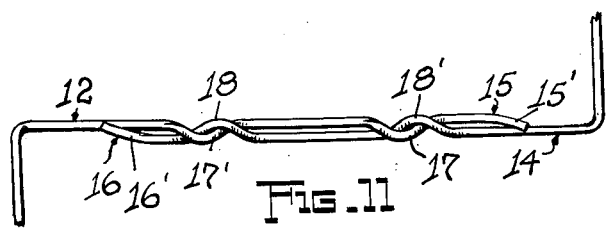
Figure 12:
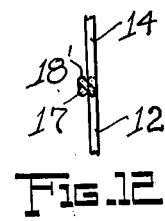

In the drawings:
FIG. 1 is a side view of a straight steel wire of the type used in the releasable steel wire coupling connection shown in FIG. 5.
FIG. 2 is an end view of FIG. 1.
FIG. 3 is a side view of another straight steel wire.
FIG. 4 is an end view of FIG. 3.
FIG 5 is a side view of the coupling connection of the two steel wires shown in FIGS. 1 and 3.
FIG. 6 is an end view of FIG. 5.
FIG. 7 is a plan view of one of the steel wire elements used in the releasable coupling connection shown in FIG. 11.
FIG. 8 is an end view of FIG. 7.
FIG. 9 is a plan view of the other one of the steel wire elements used in the releasable coupling connection shown in FIG. 11.
FIG. 10 is an end view of FIG. 9.
FIG. 11 is a plan view of the releasable coupling connection of the two steel wire elements shown in FIGS. 5 and 9; and
FIG. 12 is an end view of FIG. 11.
FIG. 13 is a fragmentary perspective view of a steel wire structure assembled from steel wire elements connected with each other according to the invention.
FIG. 14 is a fragmentary perspective view of one of the steel wire elements shown in FIG. 13.
FIG. 15 is a perspective view of a steel wire spring assembly of three steel wire elements releasably connected with each other according to the invention.
FIG. 16 is a perspective view of a wire strut element assembled from two identically shaped wire elements releasably connected with each other according to the invention; and
FIG. 17 is a perspective view of modified form of steel wire structure assembled from steel wire elements releasably connected to each other in accordance with the invention.

Referring now more specifically to the exemplified form of the invention shown in FIGS. 1 through 6 of the drawings, reference numeral 2 denotes a coupling connection of two steel wires 3 and 4 which include straight, identically constructed end portions 5 and 6. These straight end portions each include two longitudinally spaced notch-like configurations or V-shaped bends 7, 7' and 8, 8', V-shaped bends 7 and 8 being the outer or end bends near the ends of the respective straight end portions 5 and 6, and V-shaped bends 7' and 8' being the inner bends spaced from the outer bends by straight sections 9 and 10. The V-shaped bends of the straight end portions 5 and 6 are arranged in a single plane for a purpose later to be described.

Coupling connection 2, in which the straight end portions 5 and 6 of steel wires 3 and 4 are arranged opposite each other and overlapped, has V-shaped bends 7 and 8' and 8 and 7' aligned with each other so that the outer and inner V-shaped bends 7 and 7' of straight end portion 5 oppose the inner and outer V-shaped bends 8' and 8 of straight end portion 6. The aligned V- shaped bends are in hook-like fashion engaged with each other at a substantial right angle. This is effected by engaging the inner V-shaped bend of one straight end portion with the outer V-shaped bend of the other straight end portion and engage the outer V-shaped bend of said one straight end portion with the inner V-shaped bend of the other straight end portion by springing such outer V-shaped bend over the inner V-shaped bend of said other straight end portion.

This springing of said straight end portion causing the hook-like engagement of the last mentioned V-shaped bends in the straight steel wire portions effects a yielding deforming and thereafter yielding reforming of the respective straight steel wire portion and results in a coupling connection which is interlaced and resists tensile as well as torsional stresses.

Release of the coupling connection is effected by springing the straight steel wire portions in opposite directions with respect to each other.

The structure shown in FIGS. 7 through 12 shows a coupling connection of two wire spring elements 12 and 14, in which the straight steel wire portions 15 and 16 include V-shaped bends 17, 17′ and 18, 18′, respectively. The construction of the V-shaped bends in straight steel wire portions 15 and 16 is substantially similar to those previously described, with the exception that V-shaped bends 17, 17′ and 18, 18′ extend at an angle of forty-five degrees (45°) to the plane of the coupled wire elements for a more compact coupling connection reduced in the height of its cross section.

The structure of FIGS. 7 through 12 additionally shows straight steel wire portions 15 and 16 with slightly bent end portions 15′ and 16′. Coupled straight steel wire portions of this type extend their bent end portions over the corresponding straight steel wire portions to effect a releasable but improved coupling connection between the straight wire portions.

The described coupling connections are usable for coupling steel wires and steel wire elements differentiating in wire gages, provided, the respective V-shaped bends are properly dimensioned to insure close parallel relationship of the straight steel wire portions with respect to each other.

FIGS. 13 and 14 show the invention applied to a mat structure 19 which is assembled from three different steel wire elements 20, 21 and 22 coupled with each other by coupling connections 23, 24, 25 and 26 of the type previously described. The steel wire element 22 shown in FIG. 14 discloses the V-shaped bends 27 which are arrranged in the straight steel wire sections 28, 29 and 30 of the steel wire element.

FIGS. 15, 16 and 17 show spring structures assembled from spring elements which are connected with each other by coupling connections constructed in accordance with the invention. Thus, FIG. 15 shows a spring construction 31 assembled from an elongated steel wire spring base 32 having elongated straight side members 33, 34 and upper and lower U-shaped steel wire extensions 35 and 36 attached to the side members 33, 34 of base 32 by coupling connections 37, 38, 39 and 40 of the type previously described.

FIG. 16 shows a spring construction 41 assembled from two U-shaped steel wire elements 42, 43, the arms 44, 45 and 46, 47 of which are attached to each other by coupling connections 48 and 49 of the type previously described. In this spring construction steel wire elements have their ends 44′, 45′, 46′, and 47′ slightly bent in the manner described with respect to end portions 15′, 16′ of the coupling connection shown in FIG. 11.

FIG. 17 shows a spring construction 50 embodying an elongated steel wire base 51 having elongated straight side members 52, 53 and a substantially U-shaped steel wire extension 54 attached to the side members 52, 53 of base 51 by coupling connections 55, 56 also of the type previously described.

While there has been shown and described a particular embodiment of the invention, it will be obvious to those skilled in the art that various changes and modifications may be made therein without departing from the invention, therefore, it is intended in the appended claims to cover all such changes and modifications as fall within the true spirit and scope of the invention.

Having thus described my invention,
What I claim is:

1. In a releasable coupling connection of two substantially parallel, overlapped, portions of high carbon spring steel wire elements arranged side by side in close proximity to each other, a plurality of longitudinally spaced notch-like configurations in each of the overlapped wire portions, said notch-like configurations in said wire portions being engaged in hook-like fashion with each other so that they are at substantially right angles with respect to each other and so that one of said wire portions is on laterally opposite sides of the other wire portion on longitudinally opposite sides of each of said notch-like configurations, whereby said wire portions are interlaced with each other to withstand tensile and torsional stresses applied to the steel wire elements.

2. In a releasable coupling connection as described in claim 1, wherein said notch-like configurations in each wire portion are comprised of lateral bends in said portion.

3. In a releasable coupling connection as described in claim 1, wherein the notch-like configurations in each wire portion are substantially co-planar.

4. In a releasable coupling connection two opposed U-shaped high carbon steel wire members having opposed overlapped arms arranged parallel and adjacent to each other, and spaced notch-like configurations in the overlapped arms angularly engaged in hook-like fashion with each other, said overlapped arms being yielding sprung around each other to interlace with each other and lock same to each other by the hook-like engagement of the notch-like configurations.

5. A releasable coupling connection as described in claim 4, wherein the end portions of the overlapped arms are slightly bent to increase the locking action of the interlaced overlapped arms.

References Cited in the file of this patent
UNITED STATES PATENTS

| | | |
|---|---|---|
| 130,519 | McComb | Aug. 13, 1872 |
| 192,730 | Blake | July 3, 1877 |
| 235,183 | Van Derzee | Dec. 7, 1880 |
| 298,645 | White | May 13, 1884 |
| 646,403 | Klipfel | Mar. 27, 1900 |
| 672,977 | Cronenberger | Apr. 30, 1901 |
| 1,008,794 | Denis | Nov. 14, 1911 |
| 1,099,189 | Miller | June 9, 1941 |
| 2,454,703 | La Fond | Nov. 23, 1948 |
| 2,684,844 | Flint et al. | July 27, 1954 |